March 24, 1970     H. G. HAHM     3,502,183
DISC BRAKES
Filed April 23, 1968
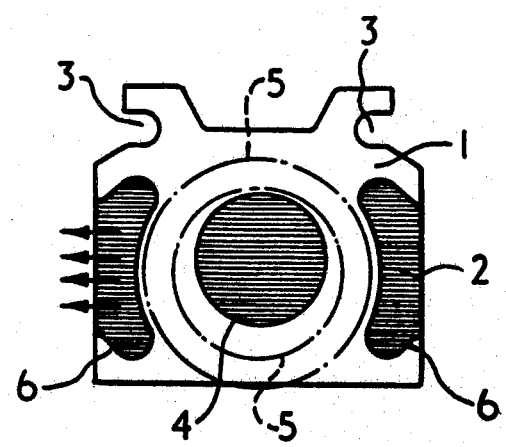

United States Patent Office 3,502,183
Patented Mar. 24, 1970

3,502,183
DISC BRAKES
Heinz Gunther Hahm, Frankfurt am Main, Germany, assignor to The Dunlop Company Limited, London, England, a corporation of Great Britain
Filed Apr. 23, 1968, Ser. No. 723,426
Claims priority, application Germany, Apr. 28, 1967,
T 33,749
Int. Cl. F16d 65/02
U.S. Cl. 188—250   2 Claims

ABSTRACT OF THE DISCLOSURE

A backing plate for a disc brake friction pad having kidney shaped apertures formed in the region of the leading and trailing edges of the plate for locking a friction pad to the plate.

---

This invention relates to backing plates for friction pads in disc brakes.

In disc brakes, as is well known, the pistons which exert the braking force act through the medium of a friction element comprising a backing plate and a friction pad. The known arrangements have the disadvantage that the connection between the friction pad and the backing plate frequently breaks down under the loading imposed upon it during braking. This disadvantage cannot be satisfactorily overcome by the use of fixing elements such as dovetail joints and the like.

One object of the present invention is to provide a backing plate for a disc brake friction element in which a secure connection between backing plate and friction pad is ensured, even under conditions of severe loading.

According to one aspect of the invention a friction pad backing plate for a disc brake comprises a metallic plate having substantially kidney-shaped apertures formed in the region of the leading and trailing edges of the plate, the inner edges of the apertures relative to the central region of the plate being curved around the central region so as to present convex faces towards the associated leading and trailing edges of the plate.

The leading and trailing edges of the friction pad backing plate defined above are those edges which would normally lie substantially perpendicular to the direction of application of a tangential drag force exerted on an associated friction pad by a brake disc during braking, the leading edge being in advance of the trailing edge with respect to the direction of rotation of the brake disc.

According to a further aspect of the invention a friction element comprises a backing plate as described above having a friction pad of correspondingly molded shape secured thereto.

The central portion of a friction pad backing plate according to the invention may be provided with a circular aperture positioned within that region of the plate which is defined by the internal diameter of the area of the plate which is designed to be contacted by an associated actuator piston, having an end face of annular or part annular shape, on application of a brake-applying force.

In addition, the backing plate may be provided with suspension eyes, these eyes being an integral part of the plate. In a friction element according to the invention the friction pad may be designed to project through the apertures in the backing plate and in addition may extend partly or completely over that region of the backing plate which would normally be contacted by an associated actuator piston, for the purpose of reducing noise.

In a preferred embodiment of the invention a friction element has a friction pad made from ceramic or ceramic-like material and a backing plate made of sheet steel or light alloy.

One embodiment of the invention will now be described with reference to the drawing:

The friction element shown comprises a friction pad 2 mounted on a backing plate 1. The backing plate is provided with kidney-shaped apertures 6 at its edges and a central circular aperture 4. The suspension eyes 3, open to the side in this embodiment, form an integral part of the backing plate 1.

When the friction element is mounted in position in a disc brake the application of a brake-applying force causes an associated actuator piston to contact the backing plate in the area indicated by dashed lines 5 and the friction element is moved into contact with an associated brake disc. The contact of the brake disc with the friction pad produces a tangential force acting on the pad tending to move the pad away from the backing plate in a direction indicated by the arrows. This direction is reversed if the brakes are applied whilst the vehicle is travelling backwards. Due to the provision of kidney-shaped apertures in the edges of the backing plate 1 the friction pad 2 is pressed more firmly into the backing plate, both in the axial and tangential directions. In addition, due to the circular aperture in the centre of the backing plate the friction pad is further secured against tangential shift relative to the backing plate. Although the present invention has been illustrated and described in connection with a selected example embodiment, it will be understood that this is illustrative of the invention and is by no means restrictive thereof. It is reasonably to be expected that those skilled in this art can make numerous revisions and adaptations of the invention and it is intended that such revisions and adaptations will be included within the scope of the invention.

Having now described my invention, what I claim is:
1. A friction pad backing plate for use in combination with a disc brake or the like, comprising a metallic backing plate having leading and trailing edges, substantially kidney-shaped apertures formed in the region of the leading and trailing edges respectively of the metallic plate, said kidney-shaped apertures each including inner edges disposed toward the central portion of the metallic plate and curved around the central portion of the backing plate to provide convexly shaped faces associated with the leading and trailing edges of the plate, a circular aperture disposed within the central region of the plate and spaced relatively to the complementary inner edges of said kidney-shaped apertures to provide an unapertured plate portion adapted to be engaged by an associated actuator means having an end face of annular or part annular configuration whereby brake-applying forces are communicated to said friction pad, at the portions of the backing plate between said central apertured portion and the kidney-shaped apertured portion.

2. Friction pad backing plate according to claim 1 provided with spaced apart suspension eyes, said suspension eyes forming an integral part of the plate.

References Cited

UNITED STATES PATENTS 3,064,769   11/1962   Billmeyer _____ 188—251 X
3,378,116   4/1968    Hennig _____ 188—250

FOREIGN PATENTS 1,340,988   9/1963   France.
  986,972   3/1965   Great Britain.

GEORGE E. A. HALVOSA, Primary Examiner